(12) United States Patent
Lacy (10) Patent No.: US 8,907,293 B2
(45) Date of Patent: *Dec. 9, 2014

(54) BORON COATED STRAW NEUTRON DETECTORS DISTRIBUTED IN A MODERATOR MATERIAL

(71) Applicant: Proportional Technologies, Inc., Houston, TX (US)

(72) Inventor: Jeffrey L. Lacy, Missouri City, TX (US)

(73) Assignee: Proportional Technologies, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,544

(22) Filed: Oct. 10, 2013

(65) Prior Publication Data

US 2014/0097351 A1     Apr. 10, 2014

Related U.S. Application Data

(63) Continuation of application No. 12/792,521, filed on Jun. 2, 2010, now Pat. No. 8,569,710.

(60) Provisional application No. 61/183,106, filed on Jun. 2, 2009.

(51) Int. Cl.
  *G01T 3/00* (2006.01)
  *G01V 5/00* (2006.01)

(52) U.S. Cl.
  CPC .............. *G01T 3/008* (2013.01); *G01V 5/0075* (2013.01)
  USPC .................................................... 250/390.01

(58) Field of Classification Search
  CPC ..... G01T 3/00; H01J 47/1272; H01J 47/1294
  USPC ........................................ 250/390.01–390.03
  See application file for complete search history.

(56) References Cited

U.S. PATENT DOCUMENTS 8,569,710 B2 * 10/2013 Lacy ........................ 250/390.01

* cited by examiner

*Primary Examiner* — Casey Bryant
(74) *Attorney, Agent, or Firm* — Hasley Scarano, L.L.P.

(57) ABSTRACT

The present invention includes an apparatus and method for neutron radiation detection. The apparatus comprises combining thin walled, boron-coated straw tubes with a plastic moderator material interspersed around the tubes. The method involves using such an apparatus through application of voltage to a central wire running inside the tubes and collecting electrical pulses generated thereby.

25 Claims, 11 Drawing Sheets

BORON COATED STRAW NEUTRON DETECTORS DISTRIBUTED IN A MODERATOR MATERIAL

CROSS-REFERENCE TO RELATED APPLICATIONS

This application is a continuation of U.S. patent application Ser. No. 12/792,521, filed Jun. 2, 2010, which claimed the benefit of and priority to U.S. Provisional Application No. 61/183,106, filed Jun. 2, 2009. Both of these earlier applications are hereby incorporated herein in their entirety, including the original filed claims, for all purposes, including but not limited to the description of the invention.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to radiation detection. More particularly, the invention relates to a method and apparatus for passive detection of fissile material with some particular applications in homeland security. Even more particularly, the invention relates to portal monitors for detecting radiation from cargo.

2. Description of the Related Art

The limited inventory and minute natural abundance of $^3$He gas on Earth necessitate the adoption of new technologies for the detection of neutrons, especially in homeland security applications, where large volume deployments are being considered that would exhaust the entire world supply.

The only practical source of $^3$He on Earth is through production of the intermediary radioactive tritium ($^3$H) gas. Tritium decays to $^3$He at a rate of 5.5% per year. Tritium was produced over the time frame from 1955 to 1988 for use as a critical ingredient of nuclear weapons. Production ceased in the US in 1988 and likely will not resume, as there is currently an adequate supply to sustain the diminishing nuclear weapons inventory. The current worldwide production of $^3$He is estimated at 8 kiloliters per year.

US government plans to equip major seaports with large area neutron detectors, in an effort to intercept the smuggling of nuclear materials, have precipitated a critical shortage of $^3$He gas. It is estimated that the annual demand of $^3$He for US security applications alone is 22 kiloliters, more than the worldwide supply. This is strongly limiting the prospects of neutron science, safeguards, and other applications that rely heavily on $^3$He-based detectors. Clearly, alternate neutron detection technologies that can support large sensitive areas, have low gamma sensitivity, and low cost must be developed.

The background to the present invention and related art is best understood by reference to Applicant's own prior work, including in particularly, U.S. Pat. No. 7,002,159 B2 the '159) entitled "Boron Coated Straw Neutron Detector" which issued Feb. 21, 2006. The '159 is hereby incorporated by reference in its entirety, for all purposes, including, but not limited to, supplying background and enabling those skilled in the an to understand, make and use in Applicant's present invention.

Applicant's other issued patents and pending applications may also be relevant, including: (1) U.S. Pat. No. 7,002,159 B2 (the '159) entitled. "Boron Coated Straw Neutron Detector"; (2) U.S. Pat. No. 8,330,116 entitled "Long Range Neutron-Gamma Point Source Detection and Imaging Using Rotating Detector"; (3) U.S. patent application Ser. No. 13/106,818 entitled "Neutron Detectors for Active Interrogation"; and (4) U.S. patent application Ser. No. 13/106,785 entitled "Sealed Boron Coated Straw Detectors" Each of these listed patents and applications are hereby incorporated by reference in their entirety for all purposes, including but not limited to as background material and as description supporting certain embodiments of the claimed invention.

BRIEF SUMMARY OF THE INVENTION

The present invention includes an apparatus and method for radiation detection. The apparatus comprises combining thin walled, boron-coated straw tube detectors with a moderator material interspersed around the tubes. The method involves using such an apparatus through application of voltage to a central wire running inside the tubes and collecting electrical pulses generated thereby.

Boron coated straw tubes as disclosed in the '159 patent, as well as prior art $^3$He detectors, work well in detection of low energy neutrons ("slow neutrons"), but they are inefficient detectors of high energy neutrons ("fast neutrons"). Addition of a moderator to $^3$He detectors provides limited improvement. The present invention provides the optimum detection of fast neutrons by combining the thin walls of a boron coated straw tube with a moderator material. In one embodiment of the invention, the moderator material is provided by a block of high density polyethylene or other plastic having high hydrogen content and minimal content of neutron absorbing nuclei such as Nitrogen. The block has holes throughout its length into which straw detectors can be inserted. In another embodiment, the moderator material is interspersed between the straw detectors by using closely packed plastic tubes having an internal diameter about 50 to 500 μm larger than the outside diameter of the straws such that the straw detectors can be inserted inside the tubes. The claimed arrangement requires less travel of neutrons between detectors and less loss of neutrons in the moderator material which results in more efficient detection.

An embodiment of the present invention is particularly useful in detection of neutron and gamma emissions from cargo arriving in various ports of entry.

DETAILED DESCRIPTION OF THE INVENTION

Figure 1A:
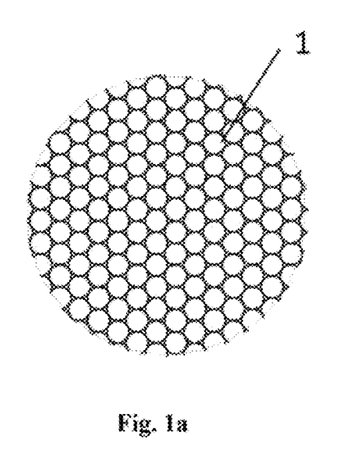
FIG. 1a depicts a cross-section of an embodiment of the detector of the present invention having a continuum of closely packed straws.
Figure 1B:
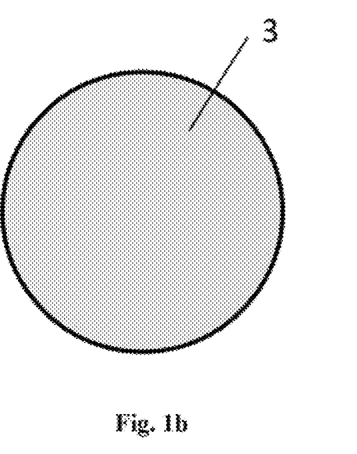
FIG. 1b (prior art) depicts a traditional $^3$He detector.

The boron straw detector of a preferred embodiment is based on arrays of thin walled boron-coated aluminum or copper tubes ("straws"), about 4 mm in diameter, coated on the inside with a thin layer of $^{10}$B-enriched boron carbide ($^{10}B_4C$). Thermal neutrons captured in $^{10}$B are converted into secondary particles, through the $^{10}$B(n,α) reaction:

The $^7$Li and α particles are emitted isotropically in opposite directions with kinetic energies of 1.47 MeV and 0.84 MeV, respectively (dictated by the conservation of energy and momentum). Since the boron carbide layer is very thin, on the order of 1 μm, one of the two charged particles will have a high probability of escaping the wall and ionizing the gas contained within the straw. A detector consisting of a continuum of close-packed straws 1, as shown in FIG. 1a, coated with 1-μm-thick $^{10}B_4C$, offers a stopping power for neutrons equivalent to that of 2.6 atm of $^3$He gas detector 3 (FIG. 1b).

In addition to high abundance and very low cost of boron on Earth, the boron-coated straw (BCS) detector offers distinct advantages over conventional $^3$He-based neutron detectors, including sensitivity to both neutrons and gammas rays (gamma rays are converted in the straw wall material), low weight, safety for portable use (no pressurization), and low cost. Furthermore, in imaging applications, the BCS high level of segmentation supports count rate capabilities and parallax-free position encoding, both difficult to achieve in conventional $^3$He pressure vessel designs. In addition, the straw signal rise time of 45 nsec is about 20 times faster than that of a large diameter $^3$He tube affording much higher rate per detection tube and far higher microphonic immunity.

In homeland security applications there is a need to detect spontaneous fission sources, such as plutonium and uranium, which may be smuggled into large cargo containers. The energy spectrum of neutrons emitted by these sources resembles that of $^{252}$Cf, a common laboratory source. Its spectrum peaks between 0.5 and 1.0 MeV, with a significant tail up to 10 MeV.

The detection of such high energy neutrons is commonly achieved with slow neutron detectors surrounded by a moderator, a hydrogen-rich material like polyethylene ($C_2H_4$). Thermal neutron detectors, typically based on neutron reactions with $^{10}$B, or $^3$He, as discussed above, have high detection efficiency for slow neutrons (<0.5 eV) but the probability of capturing neutrons with energies higher than a few keV is very low, and drops continuously with increasing energy. Fast neutrons entering the moderating material collide with hydrogen atoms, losing much of their energy, and they can subsequently be captured, with high efficiency, inside the detector.

Figure 2:
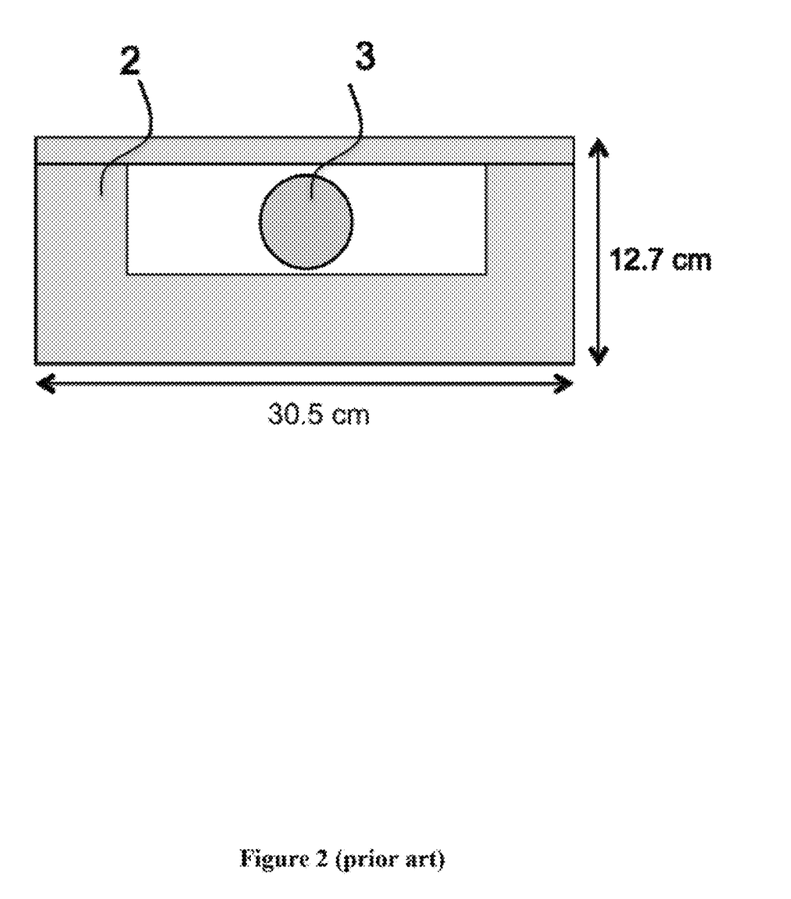
FIG. 2 (prior art) depicts a typical detector-moderator assembly of the prior art used as a portal monitor, with a $^3$He tube inside a polyethylene block.

Portal monitors are a useful example of a thermal detector and moderator assembly designed to detect high energy neutrons. Widespread installation at ports of entry, where standard cargo containers can be screened efficiently and without costly delays, has been proposed and is under evaluation. In a common design, these monitors are installed on either side of a drive-through lane, where a potential source inside a slowly moving cargo container is always less than 2 meters away from the detector face. The detector itself is one or two $^3$He tubes, pressurized to 3 atm or less (absolute), enclosed inside a moderator box 2, as shown in FIG. 2. The dimensions of the tube are 5.08 cm diameter by 187 cm length. The moderator box outer dimensions are 30.5×12.7×215 cm$^3$.

In general, the design of a moderated detector requires optimization of the amount of moderator present: a thicker moderator can thermalize more neutrons, but it decreases the probability that these neutrons will reach the detector, simply because the detector is now a smaller fraction of the total volume, and moreover because neutron capture in the moderator itself is now more probable. Since the energy spectrum of incident neutrons can differ depending on the application, the moderator must be designed for a specific application.

Monte Carlo Simulation

We have estimated the response of the above $^3$He monitors in Monte Carlo simulations, implemented in MCNP5, and compare it against the response of a new monitor design that incorporates boron-coated straw (BCS) detectors presented earlier. We show that the BCS moderator-detector system allows for more efficient optimization of the moderator material than the $^3$He design.

Figure 3:
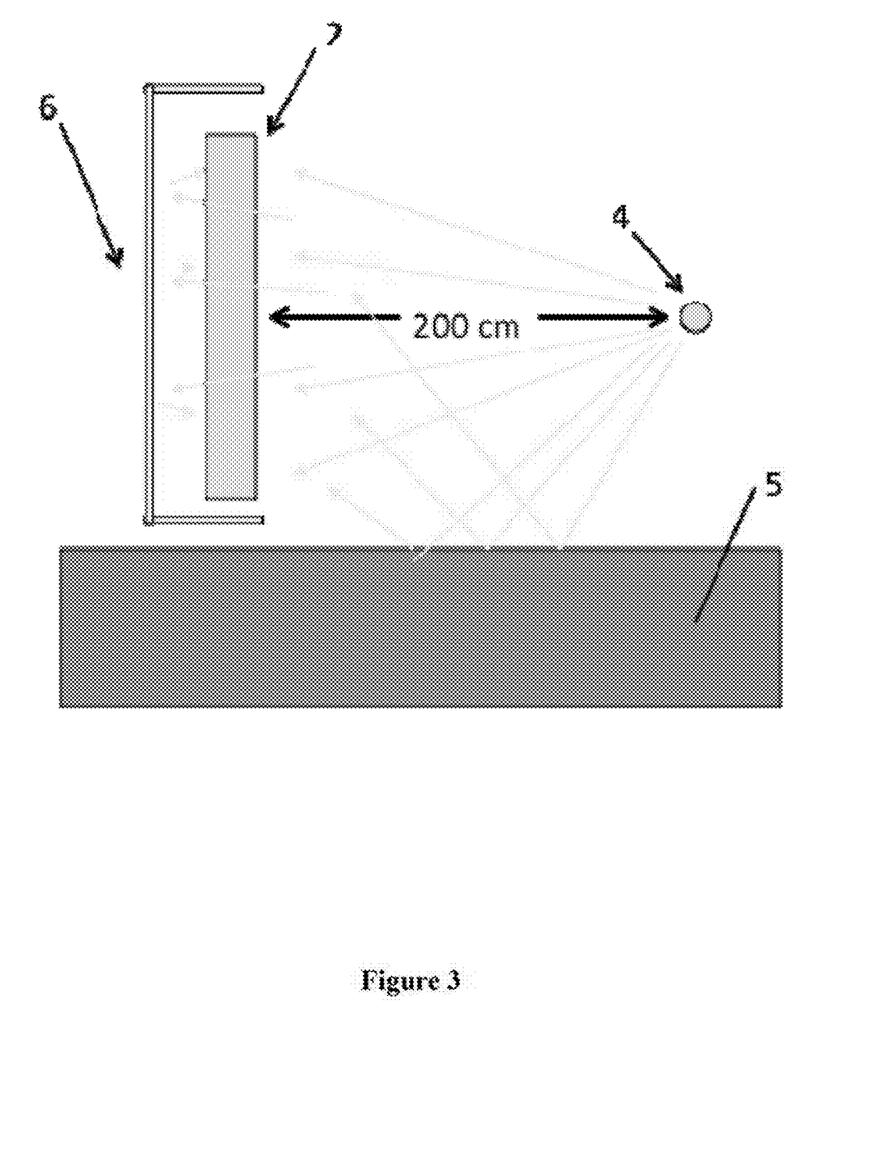
FIG. 3 depicts the simulation setup for the testing disclosed herein.

The simulation was set up as shown in FIG. 3. Results show that for a $^{252}$Cf source 4, emitting 20,000 neutrons/s (ANSI N42.43-2006 standard), at a distance of 200 cm from the detector face, the $^3$He-moderated detector counts 21 cps. The simulation assumes that, in addition to the polyethylene surrounding the detectors, neutrons thermalize and reflect from the concrete ground 5, and from the steel box 6 surrounding the detector assembly The source 4 is surrounded by 2.5 cm thick polyethylene.

Figure 4:
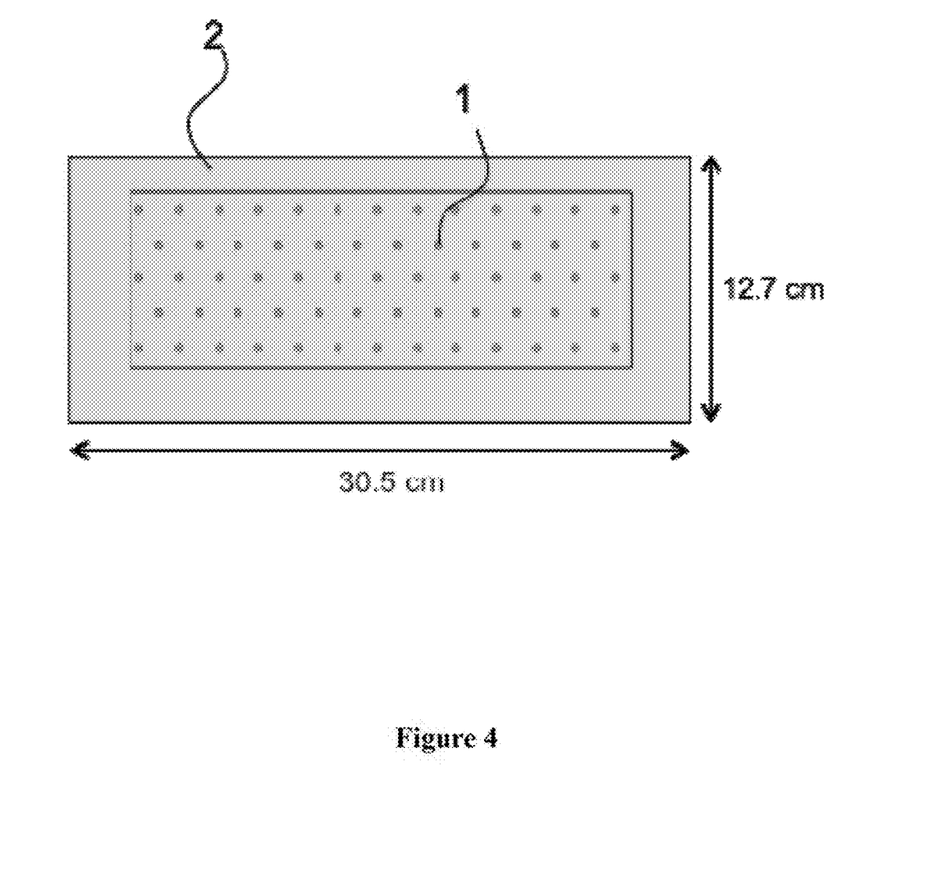
FIG. 4 depicts an embodiment of boron-coated straw (BCS) detectors in accordance with present invention embedded in a moderator block.

A moderated BCS assembly made in accordance with the present invention with the same moderator outer dimensions, requires 63 straw detectors, to achieve the same count rate of 21 cps. Each straw detector was 205 cm in length, 4 mm in diameter, and incorporating 1 μm thick $^{10}B_4C$. Although 4 mm straw tubes were utilized, larger tubes can be utilized in the present invention. Preferably, straw tubes of about 25 mm or less are utilized. The straw detectors were distributed inside the moderator volume as shown in FIG. 4. Other distribution patterns, uniform or non-uniform, are within the scope of the invention and may result in higher sensitivity (for instance a higher concentration of straws in the front part of the moderator). As in the simulated $^3$He assembly, the simulation included a steel frame and concrete ground here, as well.

The amount of $^{10}$B neutron converter present in the 63-straw assembly is 2.97 grams, or 0.297 moles of $^{10}$B. The amount of $^3$He present in the respective design simulated above is 1.38 grams, or 0.458 moles of $^3$He. Accounting for the neutron absorption cross-sections of the two isotopes (3835 barn for $^{10}$B and 5333 barn for $^3$He) we conclude that with $^{10}$B we use 2.1 times less neutron converter than $^3$He, in this application. This benefit is due to the optimization of moderator material surrounding the detectors. A large number of detectors with moderator in-between allows more neutrons to be captured, following thermalization since fewer neutrons are absorbed in the plastic medium between detectors. With the bulky $^3$He design, neutrons must travel long distances in plastic after reaching thermal energies prior to encountering the detection medium. The typical plastic employed is high-density polyethylene (HDPE) having a density of 0.95 g/cm$^3$ and a chemical composition of 14% hydrogen, 86% carbon. Other solid materials with a high hydrogen content, including most plastics, can also be utilized as a moderator material.

Figure 5:
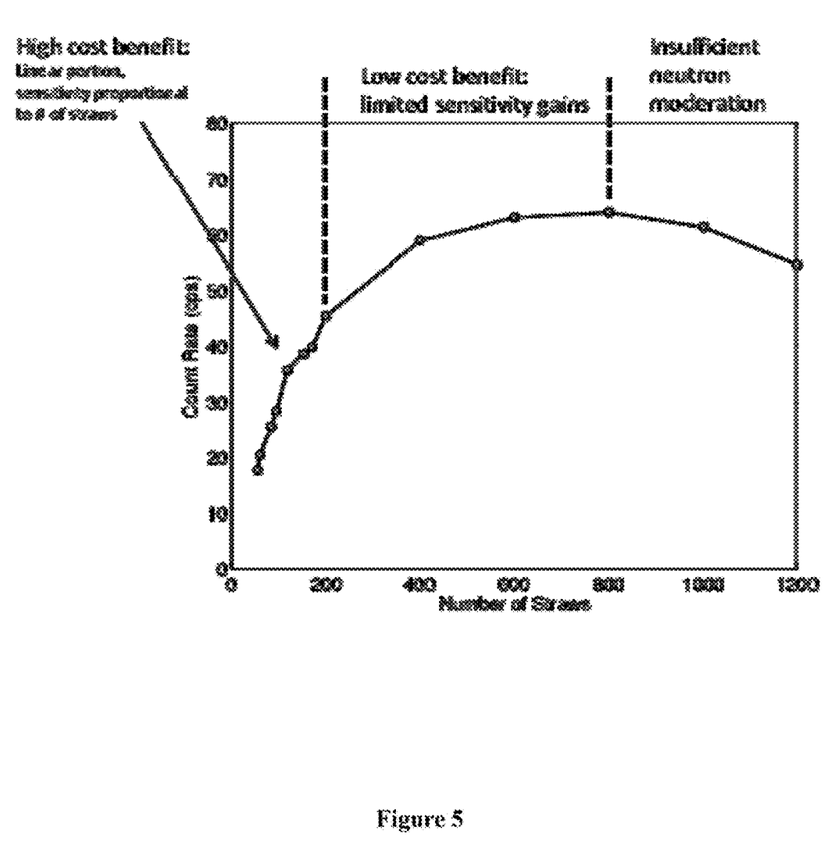
FIG. 5 depicts simulated count rate of the moderated BCS detector design having moderator dimensions that are fixed at 305×12.7×215 cm$^3$, but with the number of embedded BCS detectors varying, as plotted on the abscissa. A $^{252}$Cf source emitting 20,000 n/s was simulated at 200 cm from the moderator face, as illustrated in FIG. 3.

We have estimated the count rate obtained in the BCS-based portal monitor, as a function of the number of straw detectors. Straws were distributed with equidistant center-to-center spacing from 22.8 mm to 5.11 mm and number of straws in the moderator block from 55 to 1200. Results plotted in FIG. 5, show that count rate increases linearly with the number of straws, before it starts leveling off when the number of straws reaches about 200. In this linear region, the higher cost associated with a larger number of straw detectors can be easily justified (high cost benefit), since the rate is proportionately higher. In the region between 200 and 800 straws, the count rate still increases, but with a diminishing rate; in this region the cost benefit of a higher straw number is low. Finally, when there are more than 800 straw detectors embedded in the moderator, the count rate efficiency decreases even as the number of straws increases. In this region, the amount of moderator in the interstitial space between straw detectors is not adequate to thermalize neutrons efficiently.

Figure 6A:
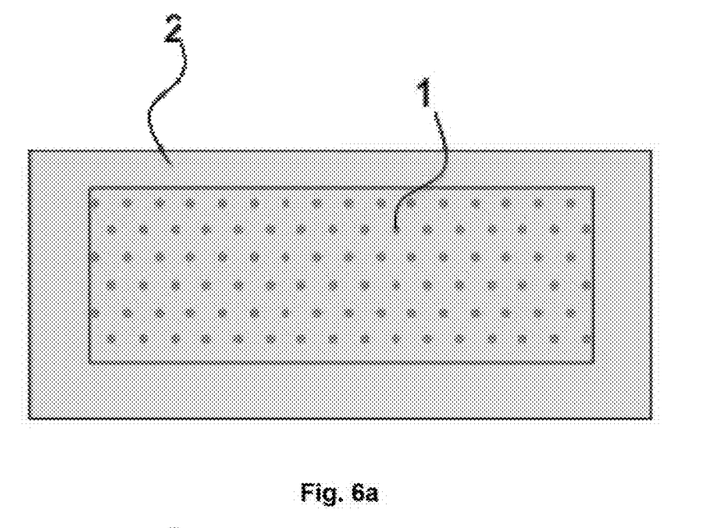
FIGS. 6a and b depict cross-sections of embodiments of the present invention having different configuration examples of 96 and 152 BCS detectors (4 mm diameter) embedded in a polyethylene block.
Figure 6B:
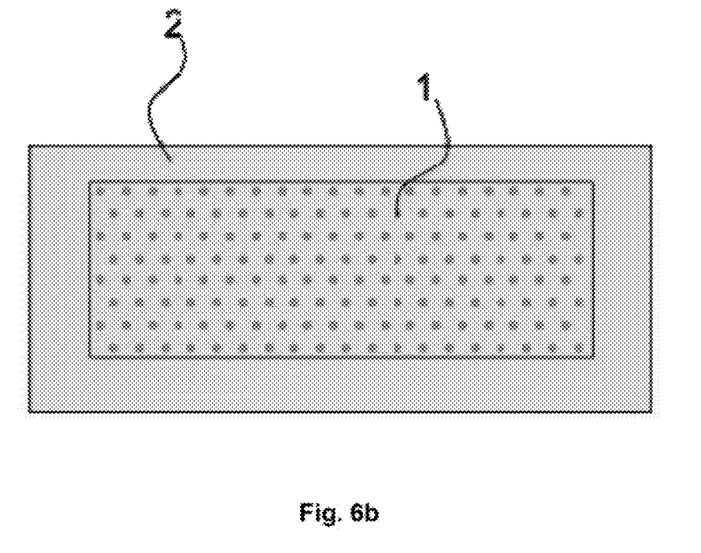

FIGS. 6a and b show configuration examples with 96 and 152 BCS detectors. The predicted count rates are 29 cps and 39 cps, respectively. The moderator thickness between neighboring straws is 12.1 mm and 9.2 mm, with center-to-center spacing of 16.1 mm and 13.2 mm, respectively.

Experimental Validation

Figure 7A:
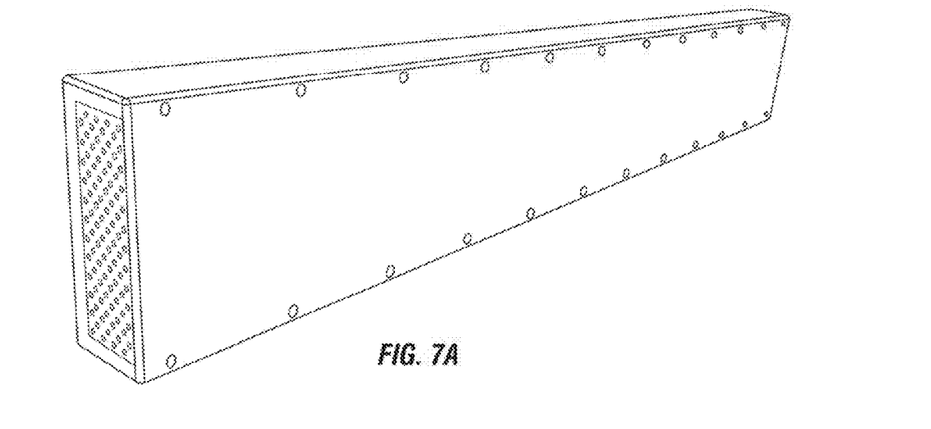
FIG. 7a depicts a moderator (HDPE) block used in an assembly of the prototype portal monitor which is an embodiment of the present invention.
Figure 7B:
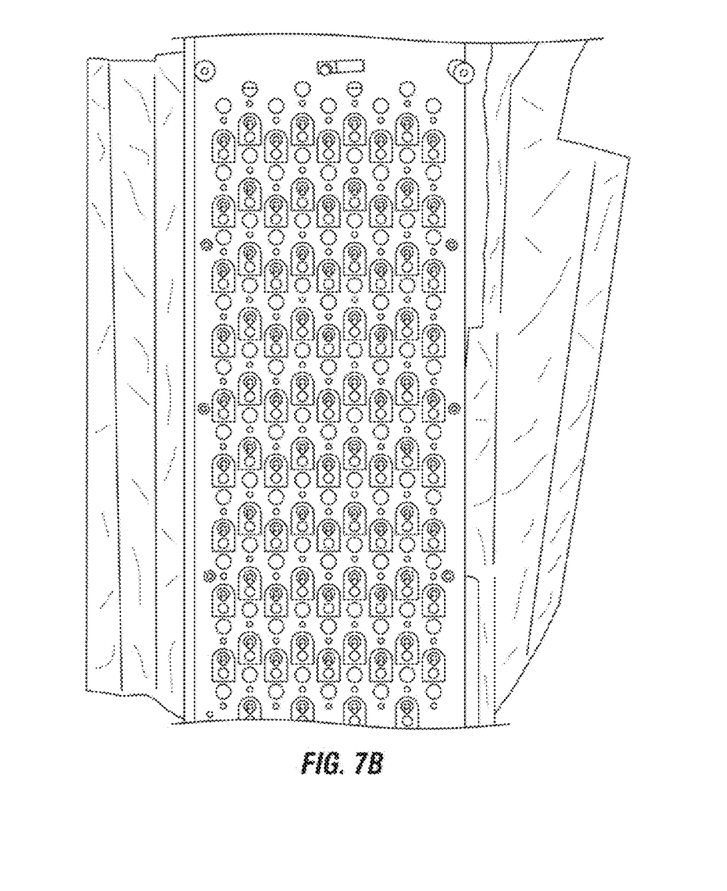
FIG. 7b depicts the end view of a prototype monitor showing 85 BCS detectors occupying an equal number of holes in the HDPE block.

A prototype portal monitor in accordance with the present invention was built based on a design that distributes small, boron-coated straw (BCS) detectors inside a solid block of high-density polyethylene (HDPE), as described earlier. The outer dimensions of the HDPE block were 30.5×12.7×215 cm$^3$ (W×D×H), which are the typical dimensions of the moderator box found inside commercial $^3$He based radiation portal monitors (RPM). The HDPE block, shown in FIG. 7, has a total of 171 holes, with a pitch of about 10 mm, and can accommodate an equal number of BCS detectors. The BCS detectors were 4 mm in diameter, 200 cm long, and were lined with $^{10}$B$_4$C. A total of 85 BCS detectors were used for the measurements presented here. The detectors occupied every other hole in the HDPE block, as shown in FIG. 7.

Measurements were conducted with two different $^{252}$Cf sources, both purchased from Frontier Technology (FT). The sources were measured by FT, and found to be 6.03±0.18 µg on Nov. 17, 2008 for the larger source, and 1.40±0.042 µg on Feb. 21, 2002 for the smaller source. The error in the FT measurements was ±3%. On the day of the measurements presented here, the source sizes were 4.11±0.12 µg and 0.164±0.0049 µg, respectively. The corresponding neutron emission rates are 9.45×10$^6$ n/s and 0.377×10$^6$ n/s, respectively. In all measurements, the sources were placed inside a pig that surrounded the source with 0.5 cm thick lead, and 2.5 cm thick polyethylene.

A $^{137}$Cs gamma source was used to test the gamma rejection capability of the prototype portal monitor. The source activity was 10 mCi.

All measurements were performed inside the laboratory area of the Proportional Technologies Inc, building in Houston, Tex.

Figure 8A:
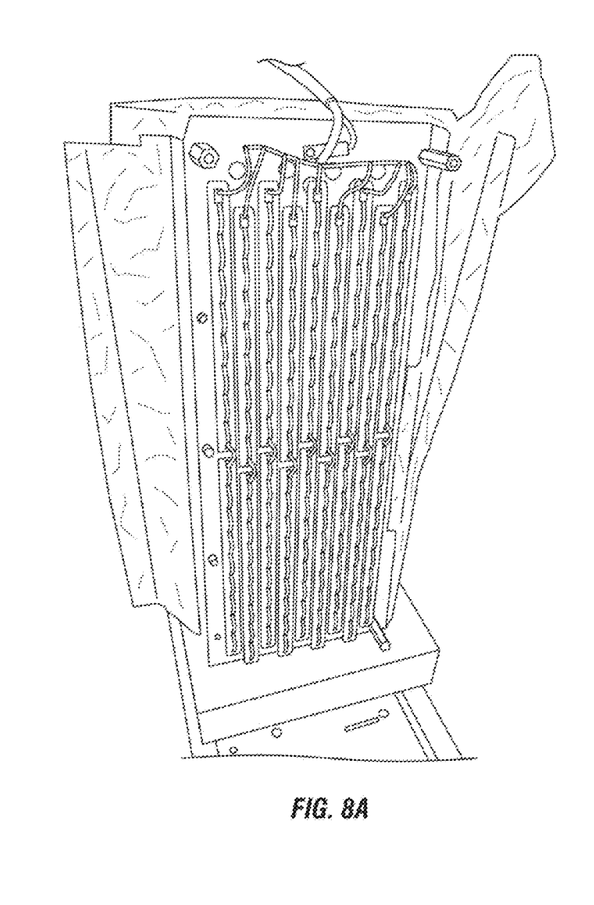
FIG. 8a depicts the end view of a portal monitor made in accordance with the present invention showing array of connectors in the foreground.
Figure 8B:
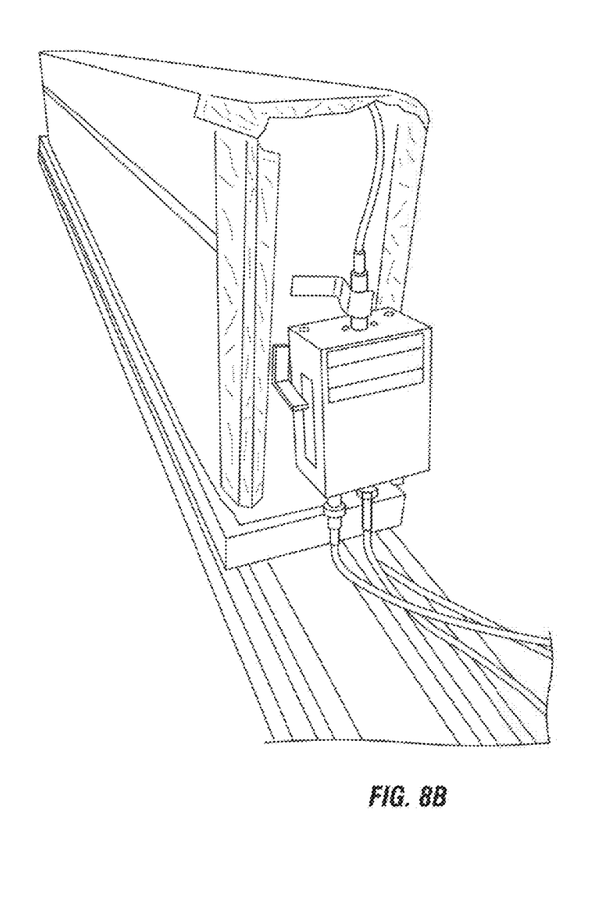
FIG. 8b shows a single preamplifier connected to all BCS detector anodes (not shown). A detector bias of 700 V is applied through the same connectors.

The straw walls (cathodes) of all detectors were connected together and grounded, using an aluminum plate, shown in FIG. 7b. Similarly the anode wires of all straws were connected together, through custom-made high voltage connectors, shown in FIGS. 8a/b. The signals were read out by connecting all anodes to a single charge sensitive preamplifier (Canberra, model 2006). An external shaper (Canberra model 2022, 1 µs shaping, time) and multichannel analyzer (Amptek MCA-8000) were used. The detectors were biased to 700 V through a 34 nF coupling capacitor.

Figure 9:
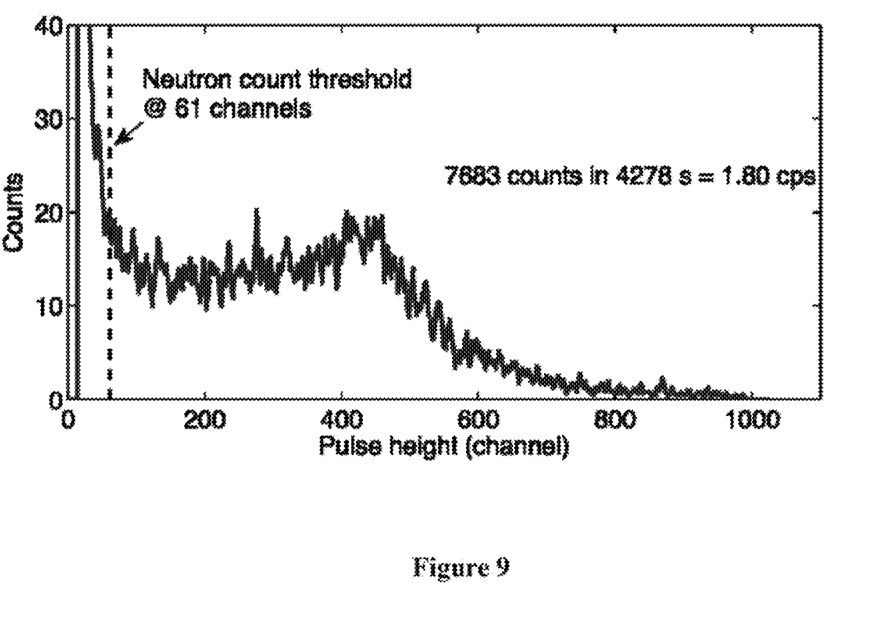
FIG. 9 is a plot of pulse height spectrum of background counts collected in prototype monitor.

Neutron Background. The neutron count rate was recorded in the absence of sources. Over a period of 4278 s, a total of 7683 counts were recorded, giving a background rate of 1.80 cps. The energy spectrum of background counts is shown in FIG. 9.

Response to $^{252}$Cf neutrons: The portal monitor was lying on a laboratory bench, oriented with its long axis parallel to the ground, as shown in FIGS. 7a/b, and with its 30-cm-long side facing the source, which was placed 2 m away from the monitor side facing it. Both the source and the monitor center were 110 cm above the concrete floor. The source was supported on a tripod.

The net count rate recorded with the large $^{252}$Cf source was 13,714 cps. The net rate recorded with the small source was 566 cps. The corresponding sensitivities, obtained by dividing the count rate by the source amount, were 3.34±0.10 cps/ng, and 3.45±0.10 cps/ng, respectively. The error in these measurements is due to the uncertainty in the neutron source size, discussed earlier (±3%). The US government requirement for portal monitors is 2.5 cps/ng.

The above rates can be scaled down to the size of a standard $^{252}$Cf source that emits 20,000 n/s. The results are 29.0±0.87 cps (large source) and 30.0±0.90 cps (small source). By comparison, the corresponding performance of $^3$He-based RPM's deployed by the US government is (at least) 20 cps in designs that employ a single $^3$He tube, and (at least) 32 cps in designs that employ 2 tubes.

Figure 10:
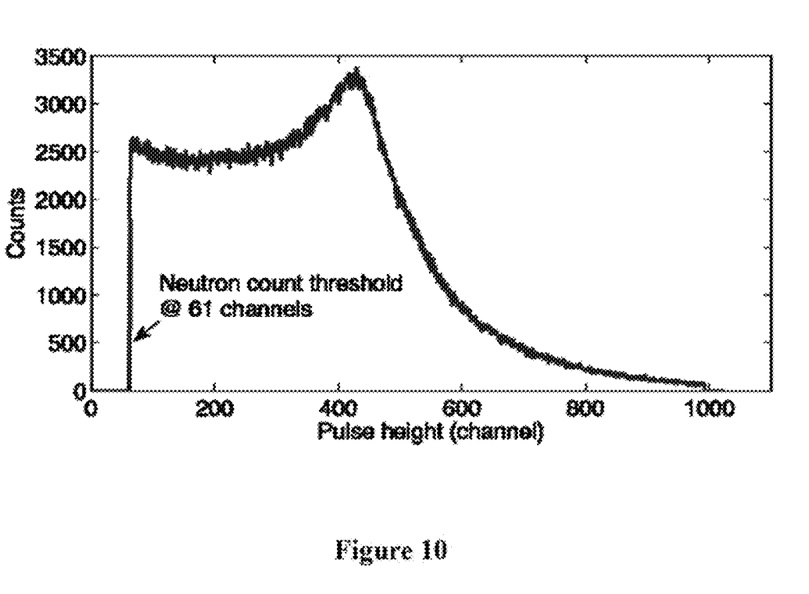
FIG. 10 is a plot of pulse height spectra collected with $^{252}$Cf source at 200 cm.

The results are summarized in Table 1. The pulse height spectra corresponding to the above measurement (large source) are shown in FIG. 10.

Response to $^{137}$Cs gammas: The portal monitor was positioned in the same manner as described above, for the neutron measurements. The gamma source was is supported on a tripod and placed 61 cm from the front side of the monitor, and 1 m above the concrete floor. The exposure rate measured at the monitor was 10 mR/hr.

Figure 11:
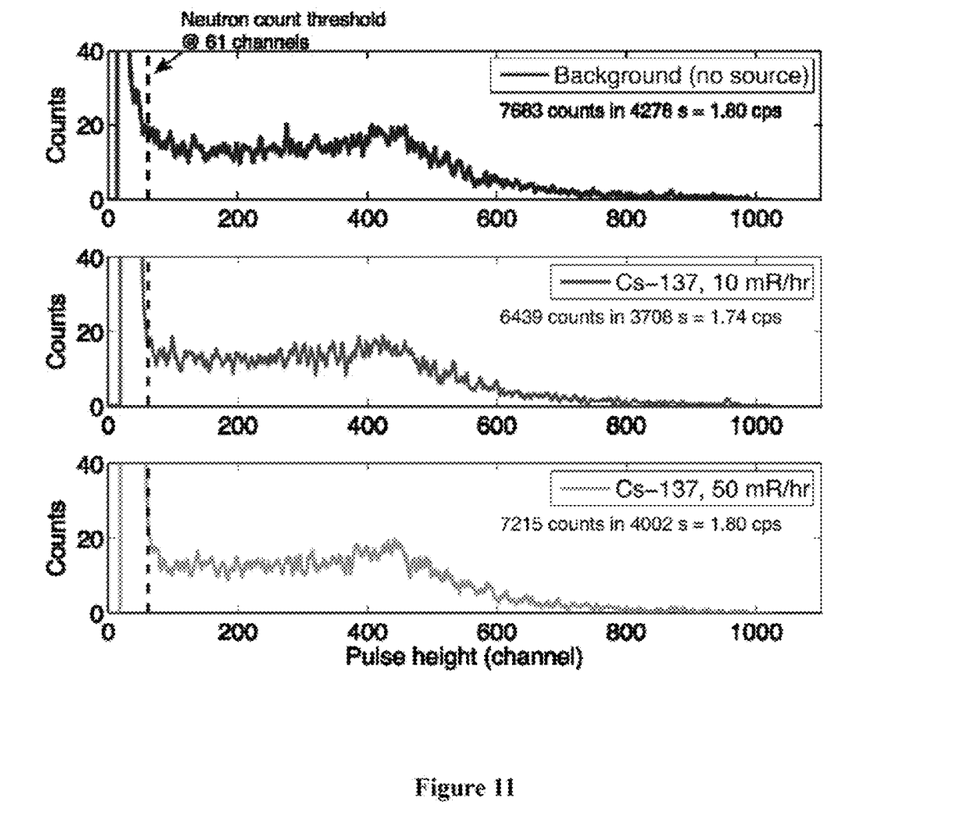
FIG. 11 is a plot of pulse height spectra collected under different gamma exposure rates.

Neutron counts collected with a 10 mR/hr gamma exposure, over a 3708-s time interval, totaled 6439. This corresponds to a neutron background rate of 1.74 cps. Another collection was done with a 50 mR/hr exposure, resulting in a rate of 1.80 cps. Table 2 lists these results, along with the net count rate, obtained by subtracting the neutron background measurement of 1.80 cps. The pulse height spectra are shown in FIG. 11.

TABLE 1

Count rates measured with $^{252}$Cf sources at 2 m.

| Source size | Background rate (cps) | Net counts | Collection time (s) | Net count rate (cps) | Sensitivity (cps/ng) | Net count rate for standard[1] source (cps) |
|---|---|---|---|---|---|---|
| Large $^{252}$Cf source (4.11 ± 0.12 μg) | 1.80 | 1,398,792 | 102 | 13,714 | 3.34 ± 0.10 | 29.0 ± 0.87 |
| Small $^{252}$Cf source (0.164 ± 0.0049 μg) | 1.80 | 283,470 | 501 | 566 | 3.45 ± 0.10 | 30.0 ± 0.90 |

[1]Standard source emits 20,000 n/s.

TABLE 2

Count rates measured with $^{137}$Cs gamma-ray source.

| Gamma exposure rate (mR/hr) | Collection time (s) | Gross Counts | Gross rate (cps) | Net count rate (cps) |
|---|---|---|---|---|
| 10 | 3708 | 6439 | 1.74 | −0.06 |
| 50 | 4002 | 7215 | 1.80 | 0.00 |

Although the invention has been described with reference to its preferred embodiments, those of skill in the an may appreciate from this description various changes and modifications which can be made thereto which do not depart from the spirit and scope of the invention as described and claimed herein.

I claim:

1. An apparatus for detecting neutrons comprising:
a plurality of thin wall boron coated straw detectors, and
a moderator material, other than materials making up said straw detectors, interspersed between said straw detectors,
wherein the interspersed moderator material comprises polyethylene or other plastics having a hydrogen content.

2. The apparatus of claim 1 wherein said moderator material is interspersed between said detectors by inserting at least one straw detector within a plastic tube having a larger internal diameter than the external diameter of said straw detectors, and arranging a plurality of plastic tubes in a packed arrangement.

3. The apparatus of claim 2 wherein the plastic tubes have an internal diameter 50 to 500 μM larger than the outer diameter of the straw detectors.

4. The apparatus of claim 2, wherein said tubes have a variable wall thickness to achieve a constant straw detector density.

5. The apparatus of claim 2, wherein said tubes have a variable wall thickness to achieve a variable straw detector density.

6. The apparatus of claim 1, wherein said moderator material interspersed between said straw detectors comprises a solid block of polyethylene with holes passing through to accommodate said straw detectors.

7. The apparatus of claim 6, wherein the polyethylene comprises HDPE.

8. The apparatus of claim 6, wherein said straw detectors are uniformly distributed within said moderator material.

9. The apparatus of claim 6, wherein said straw detectors are non-uniformly distributed within said moderator material.

10. The apparatus of claim 6, wherein said holes passing through the length of the block are arranged in a regular array with constant hole center to center distance.

11. The apparatus of claim 1, wherein said moderator material comprises polyethylene.

12. The apparatus of claim 1, wherein said moderator material comprises HDPE.

13. The apparatus of claim 1, wherein said straw detectors are arranged to be more concentrated near a forward portion of the moderator material.

14. The apparatus of claim 6, wherein said moderator material interspersed between neighboring straw detectors comprises a thickness of between 9 and 12 mm.

15. The apparatus of claim 1, wherein said detector detects both neutrons and gamma emissions.

16. The apparatus of claim 1 wherein said boron coated straw detectors comprise a thin wall tube having a thin inner wall coating of thickness in the range of 0.5 μm to 3.0 μm and high in 10B content of at least 60% by weight and having a thin electrically conductive wire centered and tensioned in the middle of said tube and suitable high voltage electrical insulation at the ends.

17. The apparatus of claim 1 wherein said boron coated straw detectors comprise a thin wall tube having a thin inner wall coating of thickness in the range of 0.5 μm to 3.0 μm and high in 10B content of at least 95% by weight and having a thin electrically conductive wire centered and tensioned in the middle of said tube and suitable high voltage electrical insulation at the ends.

18. The apparatus of claim 1, wherein said straw detectors being spaced apart from one another between 5 mm to 23 mm.

19. The apparatus of claim 1, comprising between 20 to 1200 individual straw detectors.

20. The apparatus of claim 1, comprising between 20 to 800 straw detectors.

21. The apparatus of claim 1, comprising between 10 to 200 straw detectors.

22. The apparatus of claim 1, wherein said straw detectors are 200 cm in length and 4.4 mm in internal diameter.

23. The apparatus of claim 1, wherein said straw detectors have an internal diameter between 4 mm and 25 mm.

24. The apparatus of claim 1, wherein said device has a sensitivity of at least about 3.3 cps/ng.

25. A method for detecting neutrons comprising:
providing a plurality of thin wall boron coated straw detectors having a moderator material, other than materials making up said straw detectors, interspersed between said straw detectors, wherein the interspersed moderator material comprises polyethylene or other plastics having a hydrogen content;
applying positive voltage to a central wire of said detectors; and
collecting electrical pulses generated by the detectors.

* * * * *